Aug. 26, 1947.    C. D. KARP ET AL    2,426,221
POSITIVE ACTION RELEASE HOOK
Filed June 30, 1945    2 Sheets-Sheet 1

INVENTORS.
CHARLES D. KARP
JOSEPH L. BACHMAN
BY
ATTORNEY

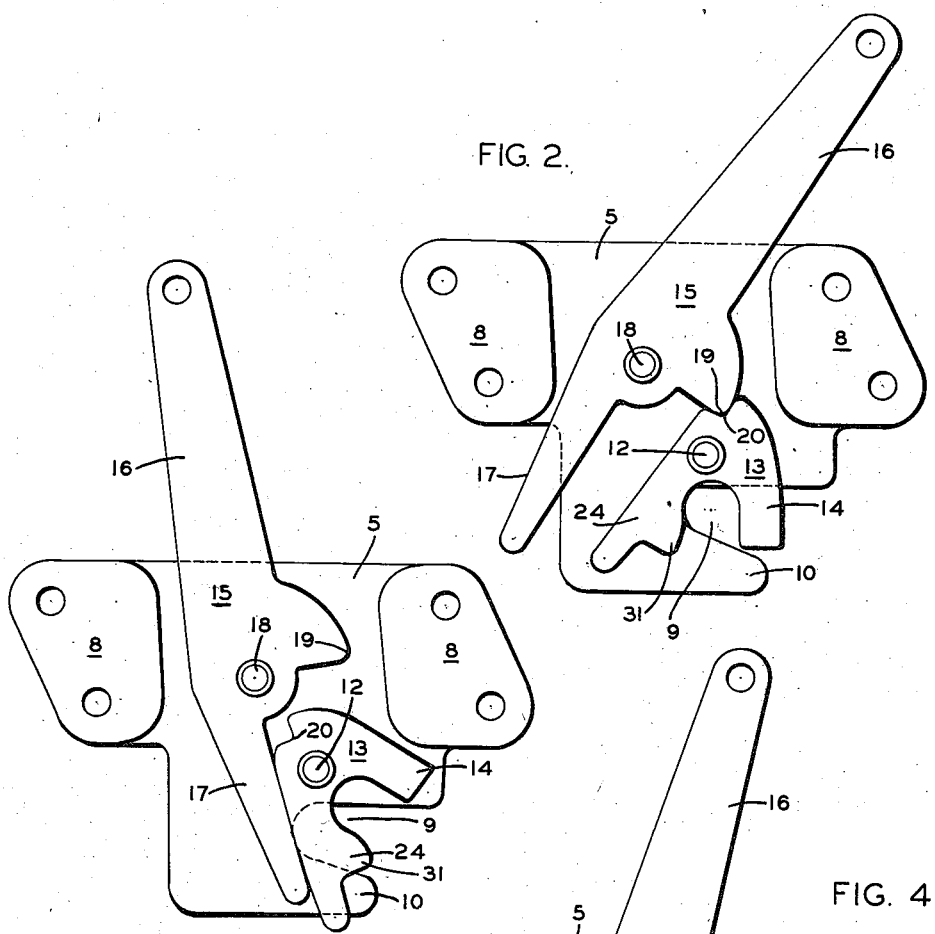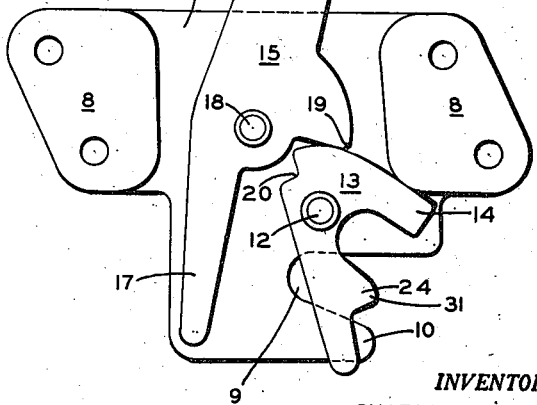

Patented Aug. 26, 1947

2,426,221

UNITED STATES PATENT OFFICE 2,426,221

POSITIVE ACTION RELEASE HOOK

Charles D. Karp and Joseph L. Bachman, Philadelphia, Pa.

Application June 30, 1945, Serial No. 602,634

9 Claims. (Cl. 89—1.5)

(Granted under the act of March 3, 1883, as amended April 30, 1928; 370 O. G. 757)

This invention relates to new and useful improvements in fastening devices, and more particularly to releasable fasteners of the hook type. Specifically, the invention relates to a release hook structure especially adapted for use with aircraft for releasably attaching thereto objects such as, for example, bombs, auxiliary fuel tanks, jet assist take-off units and similar equipment.

In military and other aircraft, bombs, auxiliary fuel tanks, jet assist take-off units and similar objects, adapted to be carried only temporarily by the plane, must be held positively and securely in place upon the plane until it is time for them to be released or jettisoned and, when released or jettisoned it is desirable that such objects be ejected or disengaged from the plane in a positive manner for safety and other purposes.

With this in mind, the principal object of the present invention is to provide a novel release hook structure for aircraft which is operable to positively and securely retain an object therein until it is desired to release or jettison the same.

Another object of the present invention is to provide a novel release hook structure of the stated character which is operable when the hook is actuated to release position to positively eject the object from the hook.

Another object of the invention is to provide a novel release hook having the features and advantages set forth which remains open and ready for reloading when actuated to release position, and which is operable automatically to lock and secure an object therein by the act of inserting an object into the release hook structure.

A further object of the invention is to provide a novel release hook structure of the character described which is of relatively simplified construction, comparatively inexpensive to manufacture and entirely efficient and fool-proof in use and operation.

These and other objects of the invention, and the various features and details of construction and operation thereof, are hereinafter fully set forth and described with reference to the accompanying drawing, in which:

Fig. 2 is a diagrammatic view of a release hook embodying the present invention showing the relative positions of the parts thereof when in locked position.

Fig. 3 is a view similar to Fig. 2 showing the relative positions of the parts of the release hook upon actuation thereof to release position to eject an object held thereby, and Fig. 4 is a view similar to Fig. 3 showing the relative positions of the parts of the release hook mechanism in position to receive an object to be held thereby.

Figure 1:
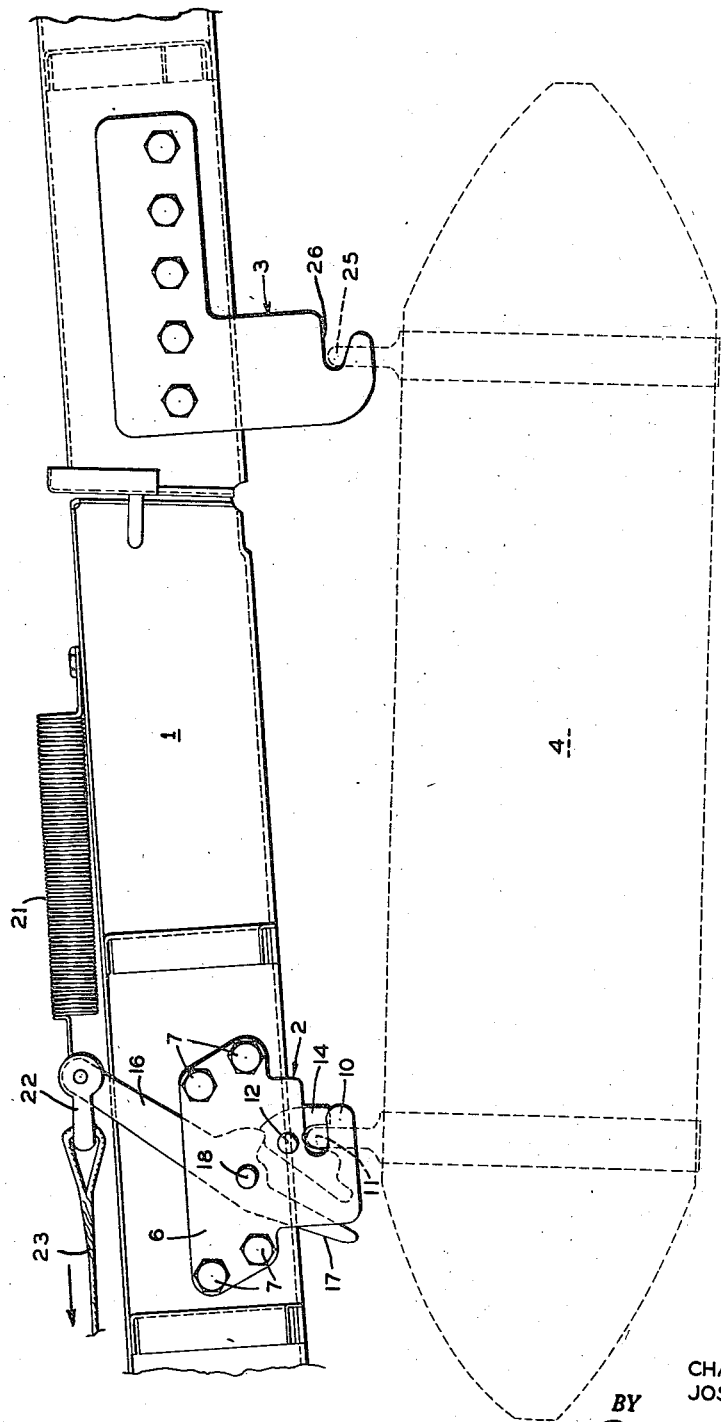
Fig. 1 is a view in elevation showing a release hook structure embodying the present invention associated with the structural framework of an airplane.

Referring now to the drawing, and more particularly to Fig. 1 thereof, reference numeral 1 designates generally a portion of the frame structure of an airplane, for example, the underside of the fuselage or a wing thereof. Associated with the frame structure 1 is a release hook structure, generally designated 2, made in accordance with the present invention, and a hook structure 3 which is constructed, for example, as shown in the drawing. The said release hook 2 and the hook 3 constitute, respectively, the front and rear connections from which a bomb, auxiliary fuel tank, jet assist take-off, or a similar object 4, is adapted to be releasably suspended or carried at the underside of the plane.

The present invention is concerned with the construction and operation of the forward release hook structure 2. Referring to Figs. 1 and 2 of the drawing, the release hook 2 may comprise a pair of side plate members 5 and 6, respectively, disposed in predetermined spaced parallel relation with respect to one another and suitably secured together in that relation by means of bolts or the like 7. The spacing of the side plate members 5 and 6 may be accomplished by providing suitable bosses 8, for example, on the inner face of one of the side plates as shown, although suitable washers or spacers may be employed for this purpose as desired. The lower portions of the side plate members 5 and 6 of the release hook 2 are provided, respectively, with outwardly or rearwardly facing slots or recesses 9 that are correspondingly positioned in spaced, side by side relation, to form a forked hook portion 10 arranged to receive the forward attaching pin or ring 11 of an object 4 such as a bomb, auxiliary fuel tank, jet assist take-off, or the like in the manner shown in Fig. 1.

Mounted upon a stud 12 for pivotal movement between the side plate members 5 and 6 of the release hook 2, relative to the slots or recesses 9 therein, is a latch member 13 having a locking arm portion 14 arranged, in one position of said latch member 13 to extend across the slots or recesses 9 and close the open side of the hook portion 10 and thereby retain in the said slots or recesses 9, and upon the hook portion 10, the forward attaching ring 11 of the object 4 as shown in Fig. 1 of the drawing.

The latch member 13 is held in the locking position just described by means of an elongated lever 15 having oppositely extending arm and finger portions 16 and 17, respectively. The lever 15 is mounted intermediate said portions 16 and 17 upon a stud 18 for pivoted movement about said stud 18 between the plate members 5 and 6 of the hook structure 2. Locking of the latch member 13 in the position shown in Figs. 1 and 2 is accomplished by providing on the lever 15, intermediate its ends and adjacent the stud 18, a projecting portion 19 constructed and arranged to engage a notch or recess 20 formed in the latch member 13. It is to be noted that the normal to the line of contact betwen the projection 19 of the lever 15 and the notch 20 of the latch member 13 passes close to the stud 18 constituting the axis of rotation of said lever 15, and hence the turning force is quite low and in a direction which tends to maintain the projection 19 engaged in the slot 20 of the latch member 13.

The arm portion 16 of the lever 15 extends above the side plate members 5 and 6 of the hook structure 2, and connected to the outer end thereof is one end of a coil spring 21 which has its other end securely anchored to the frame structure 1 of the plane as shown. Also connected to this end of arm portion 16 of the lever 15, through suitable ring connectors 22, is a cable or other control member 23 that leads to a point adjacent the station of the pilot, bombardier or other member of the flight crew, for actuation manually or otherwise, in the direction indicated by the arrow, to in turn actuate the lever 15 in a counter-clockwise direction about the stud 18 and against the restraining force of the spring 21 which functions normally to retain the lever 15 in the position shown in Figs. 1 and 2 of the drawing with its projection 19 engaging the notch 20 in the latch member 13 thereby holding the latter in the locking position until the control member 23 is actuated as described.

Formed at the other side of the stud 12 from the locking arm portion 14 of the latch member 13 is a depending trigger portion 24 having the shape and configuration shown in the drawing and arranged for cooperative engagement by the previously mentioned finger portion 17 of the lever 15 when the latter is pivoted about its stud 18 in counter-clockwise direction by actuation of the control member 23 as described. Thus, upon actuation of the control member 23 with resulting pivotal movement of the lever 15 in counter-clockwise direction against the action of the spring 21, the projection 19 of the lever 15 is disengaged from the notch or recess 20 in the latch member 13 and, as counter-clockwise rotation of the lever 15 continues, the finger portion 17 thereof moves into engagement with the trigger portion 24 of the latch member 13 thereby likewise actuating the latter in a counter-clockwise direction.

As the latch member 13 moves in a counter-clockwise direction from the position shown in Fig. 2, the locking arm portion 14 thereof is retracted upwardly between the side plate members 5 and 6 of the hook structure so that it no longer obstructs the entrance to the slots or recesses 9 with the result that the ring or like attachment 11 of the object is free to move rearwardly out of the slots or recesses 9 and free of the hook portion 10. Coincident to retraction of the locking arm portion 14 of the latch member 13 from across the slots or recesses 9 as described, the trigger portion 24 of the latch member 13 is moved by the finger 17 of lever 15 lengthwise between the slots or recesses 9 in an outward direction to the relative position shown in Fig. 3 of the drawing thereby serving to positively eject from the slots or recesses 9 the ring or other attaching device 11 of the object 4. As the forward ring or attachment 11 of the object 4 is thus ejected in a positive manner outwardly of the slots or recesses 9 of the release hook structure 2, the rearward ring or attachment 25 of the object 4 likewise is moved rearwardly out of the slot or recess 26 and free of the rearward hook 3.

In the relative positions of the lever 15 and latch 13 shown in Fig. 3 of the drawing, tension or pull upon the control member 23 has not yet been released to permit the spring 21 to return said lever 15 in a clockwise direction, and upon release of tension or pull upon the control member 23, the spring 21 will return the lever 15 in a clockwise direction to the position shown in Fig. 4 of the drawing with the surface 27 of the projecting portion 19 thereof engaging the surface of the arm portion 14 of the latch member 13 to thereby frictionally retain the latter in the position to which previously actuated with the trigger portion 24 thereof extending in or across the slots or recesses 9.

With the lever 15 and latch member 13 in the relative positions shown in Fig. 4, the release hook mechanism is in "reloading" position to receive therein another object 4 such as, for example, a bomb, auxiliary fuel tank, jet assist take-off unit, or the like, as the case may be. This may be accomplished by elevating the desired object 4 to be suspended from the hook structures 2 and 3 so as to position the ring or attaching devices 11 and 25 thereof adjacent the hook slots or recesses 9 and 26, respectively, and then moving the object 4 so as to insert the ring attachments 11 and 25 into, or inwardly of, the slots 9 and 26, respectively.

As the ring attachment 11 of the object 4 is moved inwardly of the slots or recesses 9, it engages the projection 31 on the trigger portion 24 of the latch 13 thereby actuating the latter in clockwise direction about its stud 18 and relative to the projecting portion 19 of the lever 15 until said projecting portion 19 clears the surface of the locking arm portion 14 of the latch member 13 and engages again into the notch or recess 20 formed therein, the said latch member 13 and lever 15 resuming the relative positions shown in Figs. 1 and 2 of the drawing in which they are retained by the force of the spring 21 so that the locking arm portion 14 of the latch member 13 is positively held against displacement thus securely retaining the forward ring attachment 11 of the object 4 upon the hook portion 10 of the structure 2. The fact that in the locked position of the structure the finger portion 17 of the lever 15 projects outwardly beyond the side plate members 5 and 6, as shown in Fig. 2, serves to indicate that the structure is in the locked position. Since the forward ring attachment 11 of the object 4 is retained securely in the slots or recesses 9 of the forward hook structure 2, the rearward ring or attachment 25 of the object 4 is retained and held against displacement from the slot 26 in the rearward hook structure 3.

From the foregoing it will be apparent that the present invention provides a novel release hook structure for bombs, auxiliary fuel tanks, jet assist take-off units and similar objects, adapted to be carried only temporarily by aircraft, which is operable to positively and securely retain such an object therein until it is desired to release or jettison same, and which is operable when actuated to release position, to positively eject the object from the hook. The invention also provides a novel release hook which when actuated to release position remains open and ready for reloading, and which is operable automatically to lock and secure an object therein by the act of inserting an object into the release hook structure. Furthermore, the invention provides a novel release hook structure having the aforesaid features and advantages which is of relatively simplified construction, comparatively inexpensive to manufacture, and entirely efficient and fool-proof in operation.

While a particular embodiment of the invention is illustrated and described herein, it is not intended that the invention be limited to such disclosure, and changes and modifications may be made therein and thereto within the scope of the claims.

The invention described herein may be manufactured and used by or for the Government of the United States of America for governmental purposes without the payment of any royalties thereon or therefor.

We claim:

1. A positive action release hook structure comprising a support including a hook, a latch member mounted on said support for pivotal movement and having a locking arm portion and a trigger portion arranged so that in one position of said latch member said locking arm portion is disposed crosswise of the hook opening to close the same and the trigger portion of said latch member is positioned clear of said hook opening, a lever member mounted on said support for pivotal movement and having a projection arranged to engage a recess in said latch member when the latter is in said one position, spring means tending to pivot said lever in one direction to maintain the projection thereof engaged with the recess in the latch member and positively secure the latter in said one position, and actuating means to pivot said lever in the opposite direction against said spring means to disengage the projecting portion thereof from the latch recess and cause the lever to engage the latch member and pivot the latter to retract the locking arm portion thereof from the hook opening to open the same and simultaneously move the trigger portion of said latch member into said hook opening to positively eject an object therefrom.

2. A positive action release hook structure comprising a support including a hook, a latch member mounted on said support for pivotal movement and having a locking arm portion and a trigger portion arranged so that in one position of said latch member said locking arm portion is disposed crosswise of the hook opening to close the same and the trigger portion of said latch member is positioned clear of said hook opening, a lever member mounted on said support for pivotal movement and having a projection arranged to a recess in said latch member when the latter is in said one position, spring means tending to pivot said lever in one direction to maintain the projection thereof engaged with the recess in the latch member and positively secure the latter in said one position, and actuating means to pivot said lever in the opposite direction against said spring means to disengage the projecting portion thereof from the latch recess and cause the lever to engage the latch member and pivot the latter to retract the locking arm portion thereof from the hook opening to open the same and simultaneously move the trigger portion of said latch member into said hook opening to positively eject an object therefrom, said spring means being operable upon release of said actuating means to pivot the lever in the reverse direction and engage the latch member to frictionally retain the latter in the position to which pivoted by the finger portion of said lever.

3. A positive action release hook structure comprising a support including a hook, a latch member mounted on said support for pivotal movement and having a locking arm portion and a trigger portion arranged so that in one position of said latch member said locking arm portion is disposed crosswise of the hook opening to close the same and the trigger portion of said latch member is positioned clear of said hook opening, a lever member mounted on said support for pivotal movement and having a projection arranged to a recess in said latch member when the latter is in said one position, spring means tending to pivot said lever in one direction to maintain the projection thereof engaged with the recess in the latch member and positively secure the latter in said one position, and actuating means to pivot said lever in the opposite direction against said spring means to disengage the projection thereof from the latch recess and cause the lever to engage the latch member and pivot the latter to retract the locking arm portion thereof from the hook opening to open the same and simultaneously move the trigger portion of said latch member into said hook opening to positively eject an object therefrom, said spring means being operable upon release of said actuating means to pivot the lever in the reverse direction and engage the latch member to frictionally retain the latter in the position to which pivoted by the finger portion of said lever, and said trigger portion of the latch member being actuable by the insertion of an object into said hook opening to pivot the latch member in the reverse direction and reposition the locking arm portion thereof crosswise of the hook opening and reengage the lever projection with the latch recess to thereby lock the latch member in said one position to retain the object in said hook opening against displacement therefrom.

4. A positive action release hook structure comprising a support including a bifurcated hook, a latch member mounted on said support for pivotal movement and having a locking arm portion and a trigger portion arranged so that in one position of said latch member said locking arm portion is disposed crosswise of the hook opening to close the same and the trigger portion of said latch member is positioned clear of said hook opening, a lever member mounted on said support for pivotal movement and having oppositely extending arm and finger portions and an intermediate projection, said projection being arranged for engagement with a recess in said latch member when the latter is in said one position, spring means tending to pivot said lever in one direction to maintain the projection thereof engaged with the recess in the latch member and positively secure the latter in said one position, and actuating means to pivot said lever in the opposite direction against said spring means to disengage the projection thereof from the latch recess and cause the lever finger portion to engage the trigger portion of the latch member and pivot the latter to retract the locking arm portion thereof from the hook opening to open the same and simultaneously move the trigger portion of said latch member into the hook opening to positively eject an object therefrom.

5. A positive action release hook structure comprising a support including a latch member mounted on said support for pivotal movement and having a locking arm portion and a trigger portion arranged so that in one position of said latch member said locking arm portion is disposed crosswise of the hook opening to close the same and the trigger portion of said latch member is positioned clear of said hook opening, a lever member mounted on said support for pivotal movement and having oppositely extending arm and finger portions and an intermediate projection, said projection being arranged for engagement with a recess in said latch member when the latter is in said one position, spring means tending to pivot said lever in one direction to maintain the projection thereof engaged with the recess in the latch member and positively secure the latter in said one position, and actuating means to pivot said lever in the opposite direction against said spring means to disengage the projection thereof from the latch recess and cause the lever finger portion to engage the trigger portion of the latch member and pivot the latter to retract the locking arm portion thereof from the hook opening to open the same and simultaneously move the trigger portion of said latch member into said hook opening to positively eject an object therefrom, said spring means being operable upon release of said actuating means to pivot the lever in the reverse direction and engage the locking arm portion of the latch member to frictionally retain the latter in the position to which pivoted by the finger portion of said lever.

6. A positive action release hook structure comprising a support including a latch member mounted on said support for pivotal movement and having a locking arm portion and a trigger portion arranged so that in one position of said latch member said locking arm portion is disposed crosswise of the hook opening to close the same and the trigger portion of said latch member is positioned clear of said hook opening, a lever member mounted on said support for pivotal movement and having oppositely extending arm and finger portions and an intermediate projection, said projection being arranged for engagement with a recess in said latch member when the latter is in said one position, spring means tending to pivot said lever in one direction to maintain the projection thereof engaged with the recess in the latch member and positively secure the latter in said one position, and actuating means to pivot said lever in the opposite direction against said spring means to disengage the projection thereof from the latch recess and cause the lever finger portion to engage the trigger portion of the latch member and pivot the latter to retract the locking arm portion thereof from the hook opening to open the same and simultaneously move the trigger portion of said latch member into said hook opening to positively eject an object therefrom, said spring means being operable upon release of said actuating means to pivot the lever in the reverse direction and engage the locking arm portion of the latch member to frictionally retain the latter in the position to which pivoted by the finger portion of said lever, and said trigger portion of the latch member being actuable by the insertion of an object into said hook opening to pivot the latch member in the reverse direction and reposition the locking arm portion thereof crosswise of the hook opening and reengage the lever projection with the latch recess to thereby lock the latch member in said one position to retain the object in said hook opening against displacement therefrom.

7. A positive action release hook structure comprising a pair of plate members secured together in predetermined spaced parallel relation and having open ended slots therein correspondingly positioned to define a bifurcated hook, a latch member mounted for pivotal movement intermediate said plate members and having a locking arm portion and a trigger portion arranged so that in one position of said latch member said locking arm portion is disposed crosswise of the open ends of said slots to close the same and the trigger portion of said latch member is positioned clear of said slots, a lever member mounted for pivotal movement intermediate said plate members and having oppositely extending arm and finger portions and an intermediate projection, said projection being arranged for engagement with a recess in said latch member when the latter is in said one position, spring means tending to pivot said lever in one direction to maintain the projection thereof engaged with the recess in the latch member and positively secure the latter in said one position, and actuating means to pivot said lever in the opposite direction against said spring means to disengage the projection thereof from the latch recess and cause the lever finger portion to engage the trigger portion of the latch member and pivot the latter to retract the locking arm portion thereof from the slots to open the same and simultaneously move the trigger portion of said latch member outwardly between the slots to positively eject an object therefrom.

8. A positive action release hook structure comprising a pair of plate members secured together in predetermined spaced parallel relation and having open ended slots therein correspondingly positioned to define a bifurcated hook, a latch member mounted for pivotal movement intermediate said plate members and having a locking arm portion and a trigger portion arranged so that in one position of said latch member said locking arm portion is disposed crosswise of the open ends of said slots to close the same and the trigger portion of said latch member is positioned clear of said slots, a lever member mounted for pivotal movement intermediate said plate members and having oppositely extending arm and finger portions and an intermediate projection, said projection being arranged for engagement with a recess in said latch member when the latter is in said one position, spring means tending to pivot said lever in one direction to maintain the projection thereof engaged with the recess in the latch member and positively secure the latter in said one position, and actuating means to pivot said lever in the opposite direction against said spring means to disengage the projection thereof from the latch recess and cause the lever finger portion to engage the trigger portion of the latch member and pivot the latter to retract the locking arm portion thereof from the slots to open the same and simultaneously move the trigger portion of said latch member outwardly between the slots to positively eject an object therefrom, said spring means being operable upon release of said actuating means to pivot the lever in the reverse direction and engage the locking arm portion of the latch member to frictionally retain the latter in the position to which pivoted by the finger portion of said lever.

9. A positive action release hook structure comprising a pair of plate members secured together in a predetermined spaced parallel relation and having open ended slots therein correspondingly positioned to define a bifurcated hook, a latch member mounted for pivotal movement intermediate said plate members and having a locking arm portion and a trigger portion arranged so that in one position of said latch member said locking arm portion is disposed crosswise of the open ends of said slots to close the same and the trigger portion of said latch member is positioned clear of said slots, a lever member mounted for pivotal movement intermediate said plate members and having oppositely extending arm and finger portions and an intermediate projection, said projection being arranged for engagement with a recess in said latch member when the latter is in said one position, spring means tending to pivot said lever in one direction to maintain the projection thereof engaged with the recess in the latch member and positively secure the latter in said one position, and actuating means to pivot said lever in the opposite direction against said spring means to disengage the projection thereof from the latch recess and cause the lever finger portion to engage the trigger portion of the latch member and pivot the latter to retract the locking arm portion thereof from the slots to open the same and simultaneously move the trigger portion of said latch member outwardly between the slots to positively eject an object therefrom, said spring means being operable upon release of said actuating means to pivot the lever in the reverse direction and engage the locking arm portion of the latch member to frictionally retain the latter in the position to which pivoted by the finger portion of said lever, and said trigger portion of the latch member being actuable by the insertion of an object into said slots to pivot the latch member in the reverse direction and reposition the locking arm portion thereof crosswise of the open ends of said slots and reengage the lever projection with the latch recess to thereby lock the latch member in said one position to retain the object in said slots against displacement outwardly therefrom.

CHARLES D. KARP.
JOSEPH L. BACHMAN.

REFERENCES CITED

The following references are of record in the file of this patent:

UNITED STATES PATENTS

| Number | Name | Date |
|---|---|---|
| 2,400,248 | Morgan | May 14, 1946 |

FOREIGN PATENTS

| Number | Country | Date |
|---|---|---|
| 259,688 | Italy | July 25, 1928 |
| 335,582 | Italy | Feb. 6, 1936 |